April 25, 1967     R. B. HARPER ET AL     3,315,563
TWO-AXIS DISPLAY SYSTEM
Filed July 8, 1965
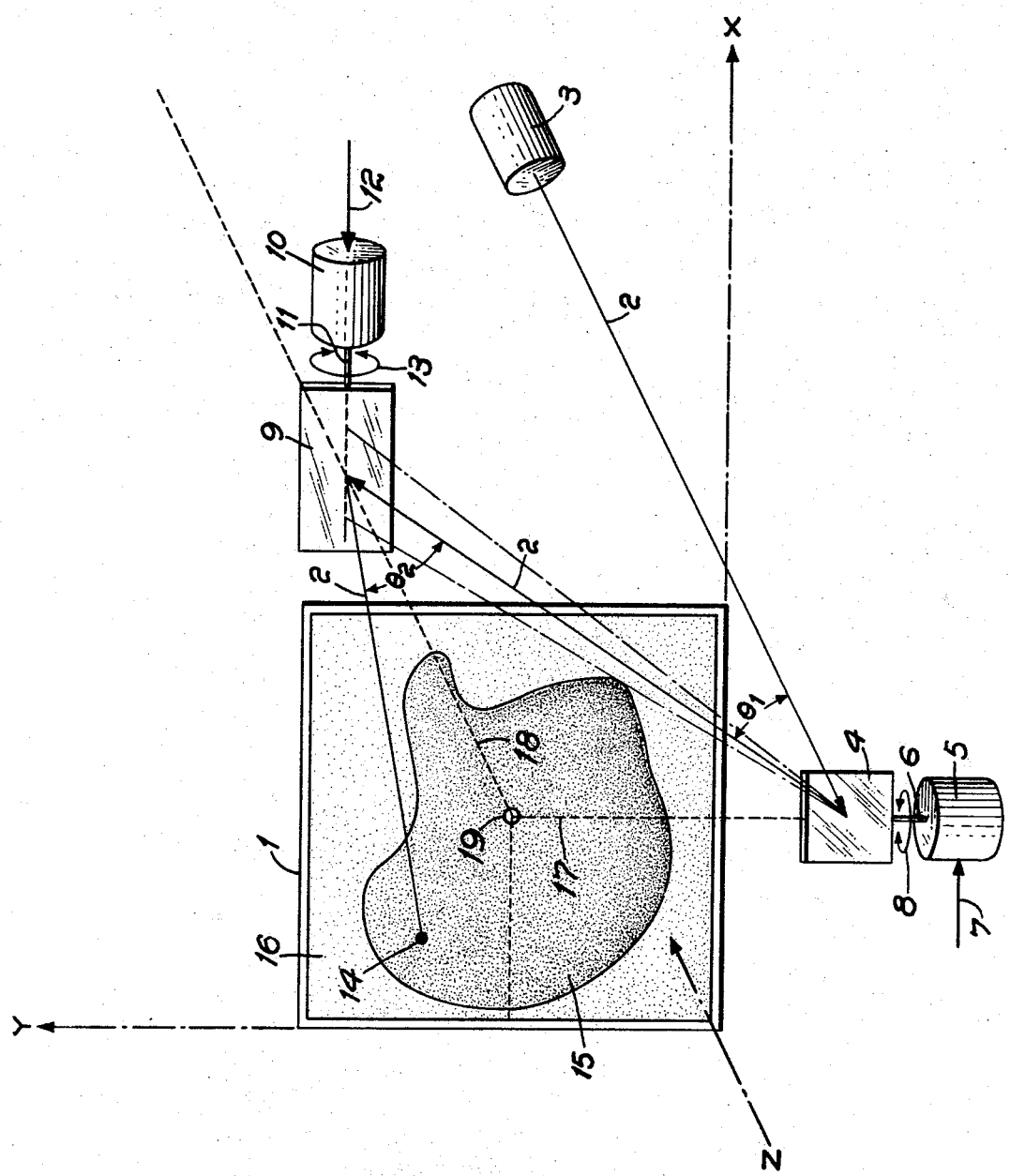
INVENTORS.
RABUN B. HARPER
BY EUGENE B. JOHNSTON, JR.
Percy P. Lanky
ATTORNEY United States Patent Office 3,315,563
Patented Apr. 25, 1967

3,315,563
TWO-AXIS DISPLAY SYSTEM
Rabun B. Harper, Chatsworth, and Eugene B. Johnston, Jr., Northridge, Calif., assignors to International Telephone and Telegraph Corporation, Nutley, N.J., a corporation of Maryland
Filed July 8, 1965, Ser. No. 470,396
5 Claims. (Cl. 88—24)

This invention relates to a two-axis display system, and more particularly to a system comprising a screen for displaying a projected light spot, the movement of which is controlled in an area defined by two axes.

Display devices of prior art for two dimensional displays ordinarily use cathode ray tube techniques which are expensive, require complex electronics and high voltage sources, and are relatively large in size.

An object of this invention is to provide an economically reliable two-axis display system made of relatively inexpensive components.

A further object of this invnetion is to produce a two-axis display system which can be made relatively small in overall size compared to the size of the screen, such for example as one having a 4 by 4 inch screen with a 1 inch base and a depth of only 4 inches.

A feature of this invention is that it may be used to provide a two-axis display for monitoring and determining the safe or unsafe condition of devices or things involving two measurable parameters, such for example as the angle of attack and Mach number of an aircraft, or as another example, the systolic and diastolic pressures of the human blood stream. For these uses the screen is divided into "safe" and "unsafe" areas from previously obtained data and/or calculations. In the case of the product of angle of attack and Mach number an indication moving from the "safe" area into the "unsafe" area would signal the immediate danger of the aircraft maneuver and could be displayed in the cockpit or to the ground monitoring crew, or both. In the case of blood pressure an indication moving from the "safe" area into the "unsafe" area would signal alarm for immediate doctor's or nurse's attention. A first reflector responsive to systolic pressure for example, will cause a light spot to move on the display screen in a given direction. A second reflector responsive to a diastolic pressure will cause said light spot to move in another direction. The resulting composite display will permit instantaneous determination of the condition of the blood pressure. While the screen in the present illustration is divided into areas, it could be plain with X and Y calibrations.

The above-mentioned and other features and objects of this invention will become more apparent by reference to the following description taken in conjunction with the accompanying drawing.

Referring to the drawing, a translucent screen 1 is located in the plane of two axes such for example as X and Y. A light beam 2 from optic source 3 is directed upon a mirror or other suitable reflector surface 4. Rotary actuator 5 of known servo type is attached to mirror 4 by a shaft 6, and controlled by signal 7. Signal 7 causes rotational movement of mirror 4 in the X-Z plane as indicated by arrow 8, thereby reflecting light beam 2 at one angle $\theta_1$ onto another mirror or suitable reflector surface 9. Rotary actuator 10 also of known servo type is attached to mirror 9 by a shaft 11, and controlled by signal 12. Signal 12 causes rotational movement of mirror 9 in the Y-Z plane as indicated by arrow 13, thereby reflecting light beam 2 by an angle $\theta_2$ onto translucent screen 1 causing projected light spot 14 to appear. Translucent screen 1 contains a predetermined "safe" area 15, covered with a transparent green or other suitable color filter; the remaining "unsafe" portion of the screen, area 16, is covered with an orange or other distinguishable color filter.

The axis of reflector 4 is located in the plane of said screen 1, and is centered on a phantom center line 17 of said screen. The axis of the reflector 9 is located in a plane parallel to the plane of the screen 1, and centered on a perpendicular phantom axis 18, passing through the center of said screen and reflector 9. Each of said reflectors are located such that when no signal is applied to inputs 7 and 12, light beam 2 will be projected as a spot 19 centrally of said screen.

Since the mirror 4 provides for X deflections of a fixed beam it can be small and together with actuator 5 take up only a narrow space at the bottom edge of the screen. While mirror 9 must intercept the beam deflected only along its X axis, it need only be long in the X direction thus only a small space at the rear side of the screen. By this arrangement a 4 x 4 inch screen, for example, can be accommodated in a casing 4" x 5" x 4". Other sizes of screens, smaller and larger, can of course be provided with casings kept relatively small in comparison therewith.

In operation, signal 7 causes rotary actuator 5 to deflect mirror 4 in the X-Z plane, causing projected spot 14 to move on translucent screen 1 in an X direction. Mirror 9 intercepts light beam 2, and when rotary actuator 10 is actuated by signal 12, the projected spot 14 is moved in the Y direction. This two-axis projection display allows instantaneous monitoring of two variables (signals 7 and 12) to determine the composite condition represented by these two variable signals, which condition is represented by the location of the projected spot 14.

While we have described above the principles of our invention in connection with specific apparatus, it is to be clearly understood that this description is made only by way of example and not as a limitation to the scope of our invention, as set forth in the objects thereof and in the accompanying claims.

We claim:
1. A two-axis display system to display information represented by sources of first and second signals comprising:
   a screen;
   means providing a light beam for projecting as a spot onto said screen;
   a first movable reflector adapted to reflect said light beam and cause said spot to move across said screen in a given direction, said first reflector being located adjacent the edge of said screen for movement about an axis, the projection of which lies in the plane of said screen;
   a second movable reflector adapted to reflect said light beam to cause said spot to move across said screen in another direction, said second reflector being disposed laterally of said screen for movement about another axis which is parallel to the plane of said screen; and
   means responsive to said first signals to control movement of said first reflector and means responsive to said second signals to control the movement of said second reflector.

2. A two-axis display system according to claim 1, wherein said screen is of translucent material with one area covered by a transparent filter of a given color and of a predetermined shape, and the remaining portion of the screen is covered by a transparent filter of a different color.

3. A two-axis display system to display the information represented by sources of X and Y signals comprising:
   a screen having an X-Y display area;

means providing a light beam for projection as a spot onto said screen;

a first movable reflector adapted to reflect said light beam and cause said spot to move across said screen in an X direction, said first reflector being located adjacent the edge of said screen for movement about a vertical axis which lies in the plane of said screen and passes through the center thereof;

a second movable reflector adapted to reflect said light beam to cause said spot to move across said screen in a Y direction, said second reflector being disposed laterally of said screen for movement about a horizontal axis which is parallel to the plane of said screen; and means responsive to the X signals to control movement of said first reflector and means responsive to said Y signals to control the movement of said second reflector.

4. A two-axis display system according to claim 3 wherein said reflectors are flat reflecting surfaces and when said second reflector is in a plane parallel to the plane of said screen a center line at right angles thereto passes through the center of said screen.

5. A two-axis display system according to claim 4 wherein said screen is divided into two areas, one area comprising a transparent filter of a given color and the other area comprising a transparent filter of a different color.

References Cited by the Examiner

UNITED STATES PATENTS

| | | | |
|---|---|---|---|
| 2,497,042 | 2/1950 | Doll | 88—10 |
| 3,134,297 | 5/1964 | Carlson et al. | 88—10 |

NORTON ANSHER, *Primary Examiner.*

R. M. SHEER, *Assistant Examiner.*